United States Patent
Qu et al.

(10) Patent No.: US 10,003,279 B2
(45) Date of Patent: Jun. 19, 2018

(54) SYSTEM AND METHOD FOR POWER CONVERSION

(71) Applicant: General Electric Company, Schenectady, NY (US)

(72) Inventors: Bo Qu, Shanghai (CN); Yingqi Zhang, Shanghai (CN); Jie Shen, Bayern (DE); Kunlun Chen, Shanghai (CN); Ying Zhang, Shanghai (CN)

(73) Assignee: General Electric Company, Schenectady, NY (US)

( * ) Notice: Subject to any disclaimer, the term of this patent is extended or adjusted under 35 U.S.C. 154(b) by 290 days.

(21) Appl. No.: 14/687,979

(22) Filed: Apr. 16, 2015

(65) Prior Publication Data
US 2015/0303819 A1    Oct. 22, 2015

(30) Foreign Application Priority Data

Apr. 18, 2014 (CN) .......................... 2014 1 0156304

(51) Int. Cl.
*H02J 3/36* (2006.01)
*H02M 7/487* (2007.01)
(Continued)

(52) U.S. Cl.
CPC ...... *H02M 7/487* (2013.01); *H02M 2001/327* (2013.01)

(58) Field of Classification Search
CPC .................................. H02J 3/36; H02M 7/155
(Continued)

(56) References Cited

U.S. PATENT DOCUMENTS 6,091,615 A * 7/2000 Inoshita ............ H02M 7/53873
363/132
6,490,185 B1    12/2002 Yamanaka et al.
(Continued)

FOREIGN PATENT DOCUMENTS

CN    101789311 A    7/2010
DE    102011087153 A1    5/2013
(Continued)

OTHER PUBLICATIONS

Hsieh et al., "One-cycle controlled half-bridge series-resonant DC to AC inverter with reduced conduction loss", Industrial Electronics, Control and Instrumentation, 23rd International Conference on, IEEE, New Orleans, LA, vol. No. 2, pp. 786-791, Nov. 9-14, 1997.
(Continued)

*Primary Examiner* — Adolf Berhane
*Assistant Examiner* — Nusrat Quddus
(74) *Attorney, Agent, or Firm* — GE Global Patent Operation; Scott R. Stanley

(57) ABSTRACT

A method used to control the operation of a converting device such that it can provide multi-level output voltage for loads. This method comprises at least the steps of: determine whether the load which the converter is providing electricity for is operating under the first condition or the second condition; generate the first pulse signal after determining that this load is operating under the first condition, select at least one of at least three different current paths, such that when the converter is selecting any of the current paths, it can provide output voltage at the same level; as well as generate the second pulse signal after determining that this load is operating under the second condition, such that the converter can perform the regular energy conversion operations.

17 Claims, 15 Drawing Sheets

(51) Int. Cl.
*H02M 7/155* (2006.01)
*H02M 1/32* (2007.01)

(58) Field of Classification Search
USPC .................. 363/37, 40, 44, 45, 84, 123–127
See application file for complete search history.

(56) References Cited

U.S. PATENT DOCUMENTS

| | | | |
|---|---|---|---|
| 6,757,185 B2 | 6/2004 | Romero | |
| 6,949,915 B2 * | 9/2005 | Stanley | H02M 1/4208 323/207 |
| 2011/0227522 A1 * | 9/2011 | Shinomoto | H02M 1/4225 318/400.29 |
| 2011/0280052 A1 | 11/2011 | Al-Haddad et al. | |
| 2012/0163057 A1 | 6/2012 | Permuy et al. | |
| 2013/0044526 A1 | 2/2013 | Soua | |
| 2013/0114320 A1 | 5/2013 | Permuy | |
| 2014/0009984 A1 | 1/2014 | Takizawa | |
| 2014/0254223 A1 * | 9/2014 | Limpaecher | H02M 7/4826 363/126 |
| 2016/0056728 A1 * | 2/2016 | Zhang | H02M 7/487 363/127 |

FOREIGN PATENT DOCUMENTS

| | | |
|---|---|---|
| EP | 2110939 A1 | 10/2009 |
| EP | 2568591 A1 | 3/2013 |

OTHER PUBLICATIONS

Umashankar et al., "NPP Inverter Topology for Renewable Energy Applications", Indian Journal of Electrical and Computer Engineering, vol. No. 1, Issue No. 1, pp. 31-38, Jan.-Jun. 2013.
Phan et al., "PWM for Active Thermal Protection in Three Level Neutral Point Clamped Inverters", IEEE ECCE Asia Downunder, Melbourne, VIC, pp. 906-911, Jun. 3, 2013.
European Search Report and Opinion issued in connection with corresponding EP Application No. 15163915.0 dated Apr. 22, 2016.
Unofficial English Translation of Chinese Office Action issued in connection with corresponding CN Application No. 201410156304.7 dated Apr. 21, 2017.
Bruckner et al., "The Active NPC Converter and Its Loss-Balancing Control", IEEE Transactions on Industrial Electronics, vol. No. 52, Issue No. 3, pp. 855-868, Jun. 30, 2005.
Floricau et al., "Loss Balancing for Active- NPC and Active-Stacked- NPC Multiconverters" 12th International Conference on Optimization of Electrical and Electronic Equipment, pp. 625-630, May 31, 2010.
Riedel et al., "Active Lifetime Extension-Demonstrated for Voltage Source Converters", IEEE 26th Convention of Electrical and Electronics Engineers in Israel, pp. 000530-534, Nov. 30, 2010.
Andler et al., "New Junction Temperature Balancing Method for a Three Level Active NPC Converter", Power Electronics and Applications, Sep. 30, 2011.
Machine translation and Chinese Office Action issued in connection with corresponding CN Application No. 201410156304.7 dated Jan. 3, 2018.

* cited by examiner

SYSTEM AND METHOD FOR POWER CONVERSION

TECHNICAL FIELD

Embodiments of the present invention relate to a method for an energy conversion system, and in particular a new modulation method operating within an energy conversion system or a controller.

BACKGROUND ART

A converter is generally used as an energy conversion device, converting energy in a certain format into energy in a different format, for example, converting DC power into AC power. In particular, due to the higher quality of their output waveform and their higher voltage capability, multi-level converters such as three-level converters, five-level converters or converters with higher levels are gaining widespread application in many industries, providing AC output voltage or AC output current for particular loads (e.g., AC electric machines).

For multi-level converters at present, such as multi-level converters with Neutral Point Piloted (NPP) topologies fabricated by nesting two or more modules together (e.g., five-level converters), there is a technical issue: during the startup phase of the load (e.g., AC electric machines), due to the lower modulation index, certain switching devices inside the multi-level converter (including diodes and switching tubes) exhibit greater losses (such as conduction loss) compared to other switching devices, or alternately the thermal conditions between multiple switching devices may be imbalanced, thereby leading to certain switching devices sustaining greater thermal stress. In order to avoid damages to some of the switching devices because they are sustaining greater localized thermal stress, a solution at present is to de-rate the output current during the startup phase. However, this solution is not suitable for situations where full torque output is required, including but not limited to elevators, therefore this solution is unable to maximize the utilization of such multi-level converters' output capacity. Therefore, it is necessary to design a new solution which does not require de-rating the output current under a low modulation index, or that can minimize the de-rating of output current as much as possible, thereby resolving the existing technical difficulties.

SUMMARY

In view of the technical issues mentioned above, the inventor of this patent employed creativity to develop a power conversion system that is capable of executing the new modulation method. This power conversion system comprises: a controller and a multi-level converter with multiple switching devices. The multi-level converter can provide multi-level output voltages during operation, while the multi-level output voltages comprise at least a positive voltage, at least a zero voltage, and at least a negative voltage. The controller communicates with this multi-level converter, where this controller, at a minimum, is being set to operate according to the amplitude of the multi-level output voltages, under at least a normal modulation mode and a heat balance modulation mode. Under this heat balance modulation mode, the controller is set to transmit a control signal to the multi-level converter, and select at least one of at least three current paths, such that this multi-level converter will provide a zero voltage when selecting any one of the three current paths, thereby reducing the thermal stress of at least some of the switching devices of this multi-level converter.

Another aspect of this invention provides an energy conversion system. This energy conversion system comprises a multi-level converter and a controller. This multi-level converter comprises multiple switching devices, with the multiple switching devices being set to convert the DC voltage at the DC link into multi-level AC voltages to be used by the electric machine. This controller communicates with the multi-level converter. This controller comprises a modulation mode selection unit, first pulse pattern distribution unit, and second pulse pattern distribution unit. This modulation mode selection unit is used to determine that the electric machine is generating the first modulation mode signal during the first condition when operating, as well as determine that the electric machine is generating the second modulation mode signal during the second condition when operating. This first pulse pattern distribution unit is connected to the modulation mode selection unit; the first pulse pattern distribution unit is set to generate the first pulse signal according to the first modulation mode signal, where this first pulse signal is used to control the multiple switching devices to balance the thermal conditions of these multiple switching devices. This second pulse pattern distribution unit is connected to the modulation mode selection unit, the second pulse pattern distribution unit is set to generate the second pulse signal according to the second modulation mode signal, where this second pulse signal is used to control the multiple switching devices to balance the thermal conditions of these multiple switching devices.

Another aspect of the present invention is to provide a controller. This controller is used to transmit the control signal to the multi-level converter in order to control this multi-level converter to output multi-level AC output voltages to the electric machine. The AC output voltages should comprise at lease a first voltage level, a second voltage level, and a third voltage level; at the same time, the second voltage level should be greater than the third voltage level and smaller than the first voltage level. This multi-level converter comprises a first flying capacitor and a second flying capacitor. This controller is configured to transmit the control signal to the multi-level converter during the startup phase of the electric machine's operations, such that the multi-level converter has at least three operating conditions corresponding to the same second voltage level. Under the first operating condition, neither the first flying capacitor nor the second flying capacitor are being charged or discharged; under the second operating condition, the first flying capacitor is being charged while the second flying capacitor is being discharged; under the third operating condition, the first flying capacitor is being discharged while the second flying capacitor is being charged.

Another aspect of the present invention provides a method, and this method is used to control the operations of the converting device such that it can provide multi-level output voltages to the load. This method comprises at least the following steps: determine whether the load to which the converter is providing electricity is operating under condition one or condition two; after determining that this load is operating under condition one, generate the first pulse signal, select at least one of at least three different current paths such that it provides the same voltage level output when the converter is selecting any one of the current paths; after determining that this load is operating under condition two, generate the second pulse signal such that the converter performs the normal energy conversion operations.

The energy conversion system, controller and method provided by the present invention balance the thermal conditions of the multiple switching devices of a multi-level converter through controlling the multi-level converter to selectively utilize redundant current paths under a low modulation index, thereby making it possible to have an output current that is not de-rated, or have an output current that is less de-rated, as well as achieving a useful technical effect.

BRIEF DESCRIPTION OF DRAWINGS

The present invention may be better understood through a description of the embodiments of this invention while referencing the accompanying drawings, which are as follows.

DETAILED DESCRIPTION

First of all, the following provides a detailed description of the embodiments and converter (which may also be referred to as an inverter, which are hereinafter collectively referred to as converter) of the present invention. The converter is usually used to perform energy conversion operations, either the unidirectional or bidirectional conversion of energy in one format (such as DC power or AC power) into energy in another format (such as DC power or AC power). In particular, the present invention proposed a new control method or modulation method for the converter, whereby this control/modulation method is used to control multi-level converters with nested Neutral Point Piloted topologies (such as five-level, seven-level, nine-level, etc.). At the same time, when operating under a low modulation index, based on the specified voltage output level, it will selectively utilize the existing redundant current paths or redundant combination of switching conditions, thereby allowing the multiple switching devices in the converter to alternately perform the switching operations according to a certain pattern. In certain embodiments, when this control/modulation method is being executed, the selection of current paths or the distribution of the combination of switching conditions allows the voltage of the flying capacitors inside the converter to be modulated or balanced. The technical effect achieved through performing the control/modulation method proposed by the present invention is: when operating under a low modulation index, since some of the switching devices are prevented from sustaining excessive thermal stress, therefore each switching device can achieve a better heat balance; furthermore, because each switching device is able to maintain a better heat balance, therefore it is not necessary for the converter to de-rate the output current, or it is able to minimize the de-rating of output current as much as possible, thereby allowing it to provide a large current output under certain conditions and maximize the utilization of the converter's output capacity.

Figure 1:
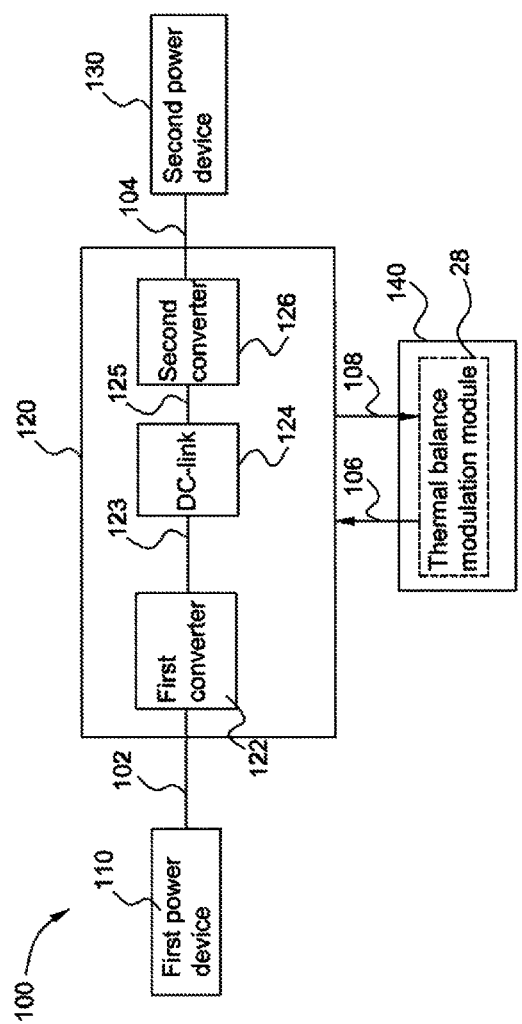
FIG. 1 is a block diagram showing an embodiment of the energy conversion system proposed by the present invention.

FIG. 1 is a block diagram showing an embodiment of the energy conversion system 100 proposed by the present invention. Basically, the energy conversion system 100 as shown can be used for any suitable energy conversion system that uses the converter as its primary component. In particular, in some embodiments, this energy conversion system 100 can be based on a multi-level converter system. This energy conversion system 100 can be applied to the following areas, including but not limited to: petrochemistry, papermaking, mining, metallurgy, power plants, water treatment plants, oil and gas drilling, subway systems, high-speed rails, elevators, and other areas, to drive a specified load, such as motors, pumps, fans, compressors, conveyors, etc.

As shown in FIG. 1, this energy conversion system 100 comprises the converting device 120 and controller 140. The converting device 120 and controller 140 are able to communicate and connect with each other. In an embodiment, this controller 140 is able to establish an electrical connection with the converting device 120, such that through a single or multiple electrical connections, such as electric wires, it is able to transmit control signals 106 to the converting device 120. In an alternate embodiment, this controller 140 can also establish an optical connection with the converting device 120, such that through optical communications, such as a single or multiple fiber optics, it is able to transmit control signals 106 to the converting device 120. This controller 140 may comprise any suitable programmable circuitry or device, including Digital Signal Processors (DSP), Field Programmable Gate Array (FPGA), Programmable Logic Controller (PLC) and Application Specific Integrated Circuit (ASIC). This converting device 120 responds to the control signals 106 transmitted from the controller 140, and performs unidirectional or bidirectional energy conversion operations between the first power device 110 and the second power device 130.

In an embodiment, this converting device 120 comprises the first converter 122, DC link 124 and the second converter 126. In an embodiment, the first converter 122 can be an AC-DC converter, configured to convert the first electric energy 102 (such as the first AC voltage) from the first power device 110 (such as the electric grid) to a DC electric energy 123 (such as a DC voltage). In an embodiment, the first converter 122 can be a converting device with passive front-ends, such as a bridge rectifier architecture formed by diodes used to perform unidirectional or AC-to-DC rectifying operations. The first converter 122 can also be a converting device with active front-ends, such as having the nested Neutral Point Piloted topologies that is described in detail below in FIG. 2, which is used to perform bidirectional energy conversion operations. In an embodiment, the DC link 124 may comprise multiple capacitors which filter the first DC voltage 123 provided by the first converter 122, thereby providing the second DC voltage 125 to the second converter 126. In an embodiment, the second converter 126 is a DC-AC converter, or a so-called inverter; it is configured to convert the second DC voltage 125 into the second AC voltage 104, while also transmitting this second AC voltage 104 to the second power device 130 (such as the AC electric machine). In an embodiment, the second converter 126 may comprise the nested Neutral Point Piloted topology shown in FIG. 2 as detailed below. Although not illustrated, this energy conversion system 100 may also comprise other components or devices, for example, filtering devices and circuit breakers can be installed between the first power device 110 and the converting device 120; furthermore, filtering devices and circuit breakers can also be installed between the converting device 120 and the second power device 130.

Referring to FIG. 1, the controller 140 of this energy conversion system 100 may also comprise the heat balance modulation module 28; this heat balance modulation module can be realized using software, or it can also be realized using hardware, or it can even be realized through a combination of software and hardware; in addition, during operations, it can also provide control signals or pulse signals 106 to a single or multiple converters of the energy conversion device 120. In an embodiment, the heat balance modulation module 28 operates according to a single or multiple input signals 108; of which, the input signal 108 can be the actual output voltage or actual output current of the converting device 120, or it can also be the voltage and current command signals that reflect the operating conditions of the second power device 130 (such as an AC electric machine). For example, during the startup phase of the AC electric machine, when the modulation index is small, the output voltage is low, while the output current is high. In an embodiment, the heat balance modulation module 28 is configured to generate a pulse signal 106 with a specific format under low modulation index, allowing the switching device in this converting device 120 to alternately perform the switching operations, therefore achieving a better heat balance. In an embodiment, the "modulation index" described here refers to the ratio between the amplitude of the actual output AC voltage of the converting device (such as the peak voltage) and the voltage of the DC link. As a non-limiting embodiment, the value of this modulation index during the startup phase of the electric machine can be 0.2. In other embodiments, the input signal 108 can also be the thermal information of the converting device 120, and the heat balance module 28 will switch to different modulation modes according to this thermal information. In addition, in some embodiments, the pulse of this pulse signal 106 can be dynamically altered or modified according to a single or multiple system status signals obtained through measurements, estimation or any other methods. As a non-limiting embodiment, this pulse signal 106 can be optimized according to the voltage of the flying capacitor, therefore modulating the voltage of the flying capacitor or achieving balance. For details regarding the heat balance modulation module 28, please refer to the description below.

Figure 2:
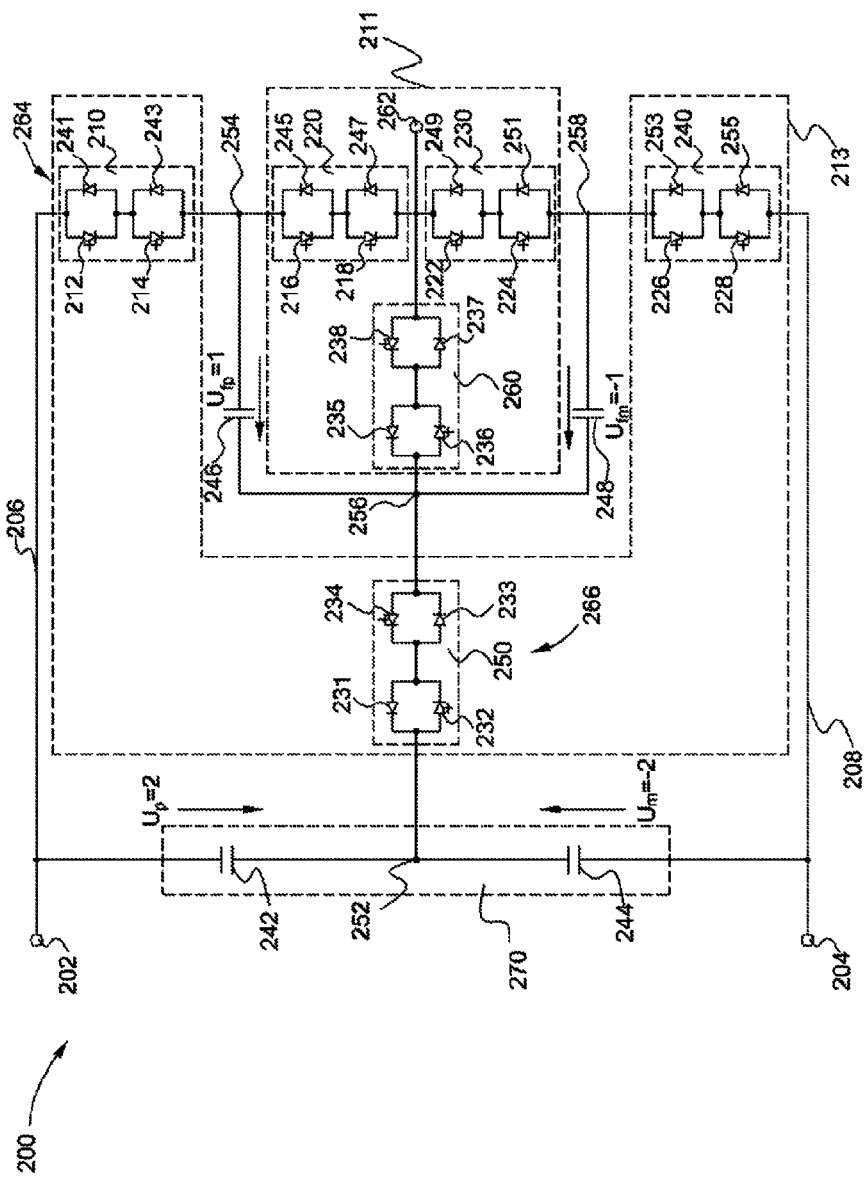
FIG. 2 is a detailed topological architecture diagram showing an embodiment of the converting device of the energy conversion system as shown in FIG. 1.

Next, please refer to FIG. 2; shown is the detailed circuit topology of an embodiment of the converter 200. More specifically, FIG. 2 shows the detailed circuitry of a converter 200 configured to comprise a nested Neutral Point Piloted topology. In a specific embodiment, the converter 200 may be structured by nesting the first converter module 211 and the second converter module 213. In an embodiment, the first converter module 211 and the second converter module 213 can be configured to have the same architecture; for example, in a specific embodiment, the first converter module 211 and the second converter module 213 are both configured to provide three-level outputs. Therefore, combining the first converter module 211 and the second converter module 213 can provide a five-level output. In other embodiments, the converter 200 can have similar nested configurations with even more converter modules in order to provide 2n+1 levels of output, where n is greater or equal to 2. The converter 200 can be executed as a phase of the second converter or inverter 126 as shown in FIG. 1, converting DC voltage into AC voltage.

As shown in FIG. 2, the first converter module 211 comprises the first switching unit 260, the second switching unit 220 and the third switching unit 230. The second converter module 213 comprises the fourth switching unit 250, the fifth switching unit 210 and the sixth switching unit 240. Of which, switching units 201, 220, 230, 240 are connected in series to form the vertical arm of the bridge 264. In the embodiment as shown, each of the four switching units 210, 220, 230, 240 comprises two switching devices connected in series. In other embodiments, each of the four switching units 210, 220, 230, 240 may also comprise only one switching device. In the embodiment as shown, the fifth switching unit 210 comprises two switching devices 212, 214 connected in series; the second switching unit 220 comprises two switching devices 216, 218 connected in series; the third switching unit 230 comprises two switching devices 222, 224 connected in series; the sixth switching unit comprises two switching devices 226, 228 connected in series. By using this serial connection method, semiconductor switching devices with low voltage rating can be used to evenly share the voltage of the DC link. In other embodiments, each of the four switching units 210, 220, 230, 240 may comprise more than two switching devices connected in series according to actual needs. The switching devices described here may be any suitable semiconductor-based switching devices, including but not limited to, Insulated Gate Bipolar Transistors (IGBT), Integrated Gate Commutated Thyristors (IGCT), and Metal Oxide Semiconductor Field-Effect Transistor (MOSFET). In the embodiment as shown, each of the four switching units 210, 220, 230, 240 are also connected in antiparallel with a diode (indicated by 241, 243, 245, 247, 249, 251, 253, 255).

Please further refer to FIG. 2, the fourth switching unit 250 and the first switching unit 260 are connected in series to form the horizontal arm of the bridge 266. In the embodiment as shown, each of the two switching units 250, 260 comprises two switching devices and two diodes. For example, the fourth switching unit 250 comprises the first switching device 232, the second switching device 234, the first diode 231 and the second diode 233. The first switching device 232 is connected with the first diode 231 in parallel; the second switching device 234 is connected with the second diode 233 in parallel. The first switching device 232 and the second diode 233 are configured to allow the first current along the first direction to flow through. The second switching device 234 and the first diode 231 are configured to allow the second current along the second direction, which is opposite the first direction, to flow through. In other embodiments, each of the four switching devices 232, 234, 236, 238 of the two switching units 250, 260 can be replaced with at least two switching devices connected in series, in order to allow the horizontal arm of the bridge 266 to also use semiconductor switching devices with low voltage rating.

Please further refer to FIG. 2, the converter 200 is connected with the DC link 270 through the positive input line 206 and the negative input line 208; of which, the positive input line 206 is connected with the first port 202, and the negative input line 208 is connected with the second port 204. In the embodiment shown, the DC link 270 comprises the first capacitor 242 and the second capacitor 244; the first capacitor 242 and the second capacitor 244 are connected between the positive input line 206 and the negative input line 208 in series. The first capacitor 242 and the second capacitor 244 are connected together to form the DC bus neutral point 252; this DC bus neutral point 252 is further connected with one end of the horizontal arm of the bridge 266.

Please further refer to FIG. 2, the converter 200 also comprises the flying capacitor section, which comprises the first flying capacitor 246 and the second flying capacitor 248. One end of the flying capacitor 246 is electrically connected with the junction 254 between the first switching unit 210 and the second switching unit 220; the other end of the first flying capacitor 246 is electrically connected with the junction 256 between the two switching units 250, 260 of the horizontal arm of the bridge 266. One end of the second flying capacitor 248 is electrically connected with the junction 256, the other end of the second flying capacitor 248 is electrically connected with the junction 258 between the third switching unit 230 and the fourth switching unit.

Figure 3:
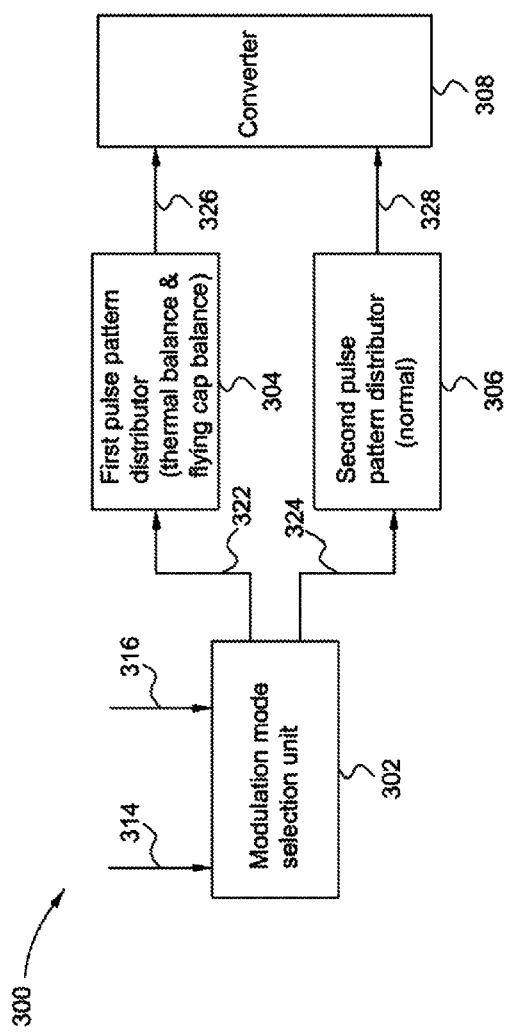
FIG. 3 is a functional block diagram showing an embodiment of the heat balance modulation module executed by the controller of the energy conversion system as shown in FIG. 1.

FIG. 3 is a block diagram showing the heat balance modulation module 300 of the energy conversion system 100 as shown in FIG. 1, or more specifically, of an embodiment executed by the controller 140 of the energy conversion system 100. As shown in FIG. 3, the heat balance modulation module 300 comprises the modulation mode selection unit 312, the first pulse pattern distribution unit 304, the second pulse pattern distribution unit 306 and the modulation module. The modulation mode selection unit 302 is configured to select the suitable modulation mode according to a single or multiple input signals in order to facilitate the subsequent generation and distribution of pulse signals by the first and second pulse pattern distribution units 306. More specifically, in an embodiment, this modulation mode selection unit 302 determines the corresponding modulation mode according to the voltage signal 314 and the current signal 316. In an embodiment, the voltage signal 314 is the actual voltage signal provided by the converter 308 to the load, such as the electric machine, while the current signal 315 is the actual current signal provided by the converter 308 to the load, such as the electric machine. During the startup phase of the electric machine, the actual voltage signal 314 is generally weak, while the actual current signal 316 is strong. When the actual voltage signal 314 is weaker than the preset voltage threshold, while the actual current signal 316 is also stronger than the preset current threshold, the modulation mode selection unit 302 generates the first modulation mode signal 322. After the electric machine has finished starting up and enters steady operating condition, the actual voltage signal 314 is generally strong, while the actual current signal 316 is weak; that is, when the actual voltage signal 314 is stronger than the preset voltage threshold and the actual current signal 316 is weaker than the preset current threshold, the modulation mode selection unit 302 generates the second modulation mode signal 324.

In an alternate embodiment, the modulation mode selection unit 302 can also be configured to generate different modulation mode signals directly based on the thermal information of the converter 308 itself. The "thermal information" described here represents the thermal or temperature condition of the converter 308, which can be measured using a thermal or temperature sensor, or it can also be calculated according to a thermal model based on signals such as the voltage and the current. In particular, in a specific embodiment, after determining that the thermal information of the converter 308 is greater than the preset temperature threshold, the modulation mode selection unit 302 generates the first modulation mode signal 322; while after determining that the thermal information of the converter 308 is not greater than the preset temperature threshold, the modulation mode selection unit 302 generates the second modulation mode signal 324.

Please refer to FIG. 3; in an embodiment, the first pulse pattern distribution unit 304 is connected to the modulation mode selection unit 302 and the modulation unit 334. The first pulse pattern distribution unit 312 is configured to respond to the first modulation mode signal 322 to generate the first pulse pattern signal 326; of which, the first pulse pattern signal 326 indicates the combination of switching conditions of the switching devices inside the converter 308, or the current paths that are expected to be formed. The first pulse pattern signal 326 generates the first pulse signal 326 through the modulation of the modulation unit 334; the first pulse signal 326 is provided to the multiple switching devices of the converter 308 in order to allow the multiple switching devices in the converter 308 to perform the switching operations according to the specific format, thereby outputting the output voltage with the specified voltage levels. For example, during the startup phase of the electric machine, the converter 308 can output three levels of output voltages, including "1", "0", "−1". It must be explained that "1", "0" and "−1" only represent three discrete voltage levels; the actual voltage values of the converter 308 may change according to the DC bus voltage. In the present invention, when the first pulse pattern distribution unit 312 operates in response to the first modulation mode signal 322, the operating condition of the heat balance modulation module 300 is defined as the "heat balance operating mode".

Figure 5:
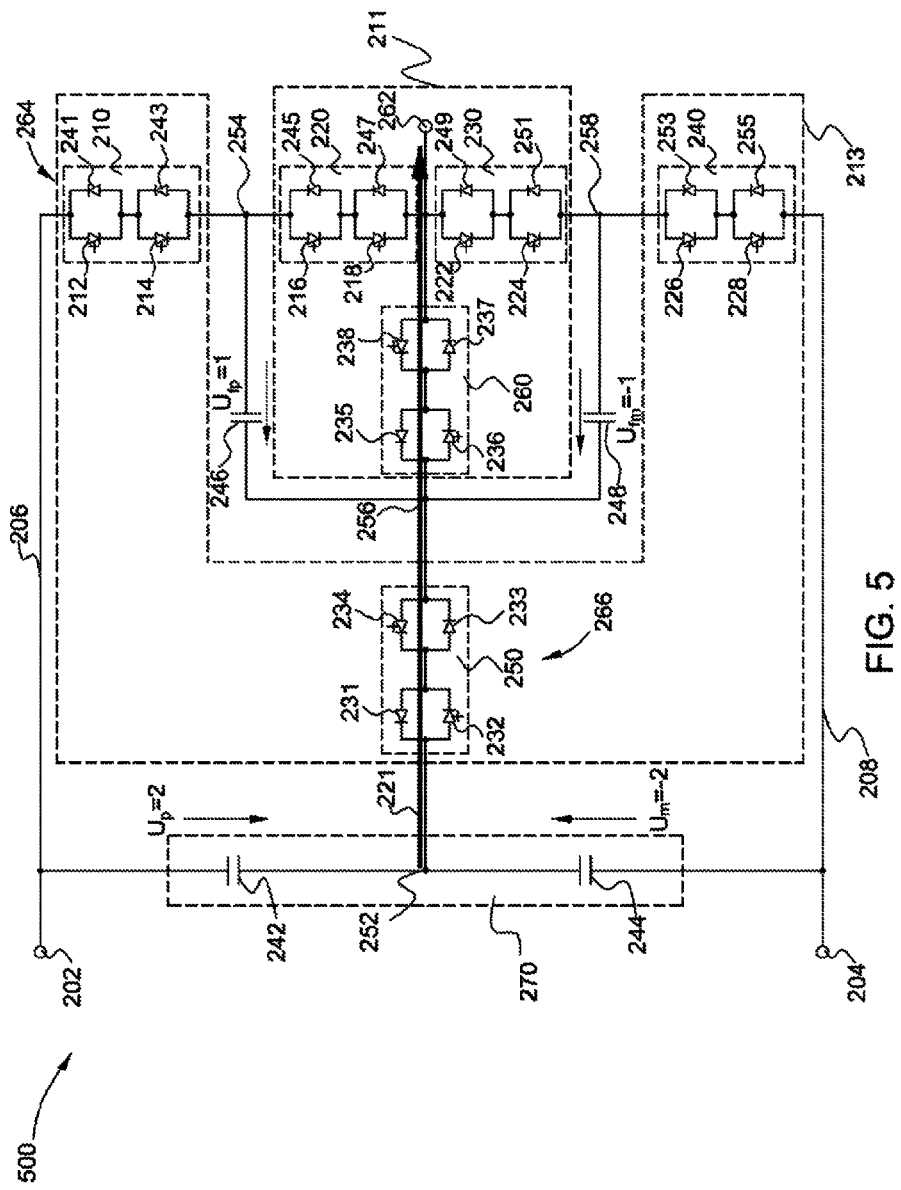
FIGS. 5, 6, and 7 are operating condition schematics showing the three different current paths when the converting device as shown in FIG. 2 is outputting a "0" voltage.

Please also refer to FIG. 5; shown is the schematic of the first operating condition 500 of the converter 200 as shown in FIG. 2 when outputting the "0" voltage output. In FIG. 5, the first switching device 232 of the fourth switching unit in the horizontal arm of the bridge 266 has been turned on, and the second diode 233 is conducting; in addition, the first switching device 236 of the first switching unit 260 has been turned on, and the second diode 237 is conducting, thereby forming the first current path 221 in the converter 200 from the DC bus neutral point 252 to the output port 262, of which the first current path 221 flows through the fourth switching unit 250 and the first switching unit 260. Furthermore, under the first operating condition 500, the multiple switching devices 212, 214, 216, 218, 222, 224, 226, 228 in the vertical arm of the bridge 264 are turned off. Therefore, the first flying capacitor 246 and the second flying capacitor 248 are neither charged nor discharged, that is, the voltages of the first flying capacitor 246 and the second flying capacitor 248 remain constant. In an alternate embodiment, the current path 221 forming inside the horizontal arm of the bridge 221 can also flow from the output port 262 to the DC neutral point 252. Under this condition, the second switching device 238 of the first switching unit 260 is turned on, and the first diode 235 is conducting; in addition, the second switching device 234 of the fourth switching unit 250 is turned on, and the first diode 321 is conducting.

Figure 12:
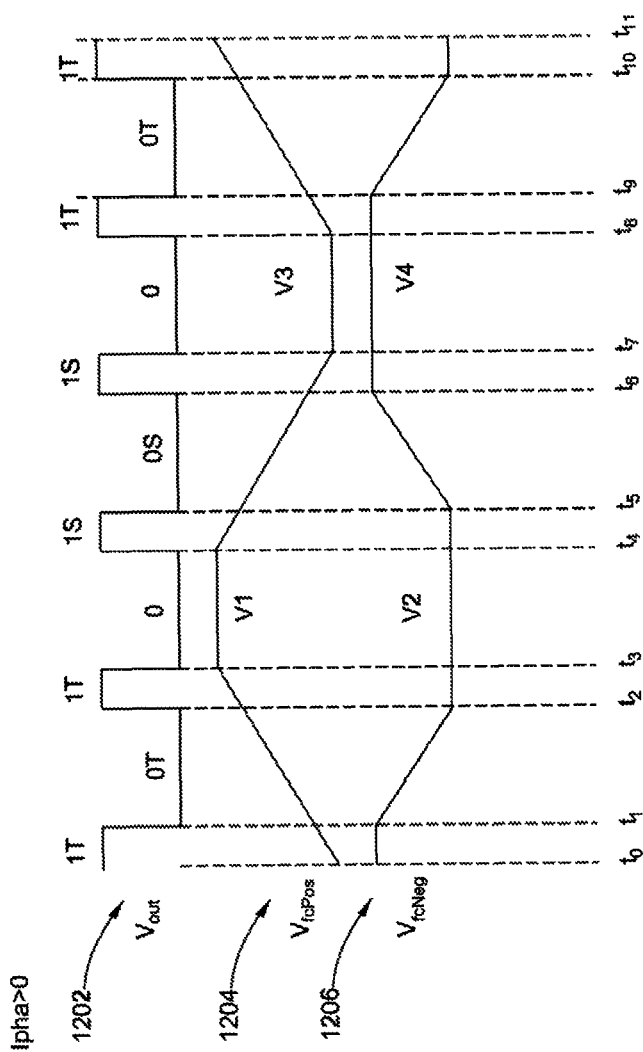
FIG. 12 is a waveform diagram of the output voltage of the converting device as shown in FIG. 2 and the voltage of its flying capacitor within a half cycle under ideal circumstances.

Please also refer to FIG. 12; shown is the waveform diagram of the converter 200 as shown in FIG. 2 within the positive half cycle of the output current, with output voltage 1202, first flying capacitor voltage 1204 and second flying capacitor voltage 1206. As shown in FIG. 12, when the output voltage 1202 is at the "0" level, such as within the time interval t3-t4, the first flying capacitor voltage 1204 has a constant voltage of V1, the second flying capacitor voltage 1206 has a constant voltage V2; within the time interval t7-t8, the first flying capacitor voltage 1204 has a constant voltage of V3, the second flying capacitor voltage 1206 has a constant voltage V4.

Figure 6:
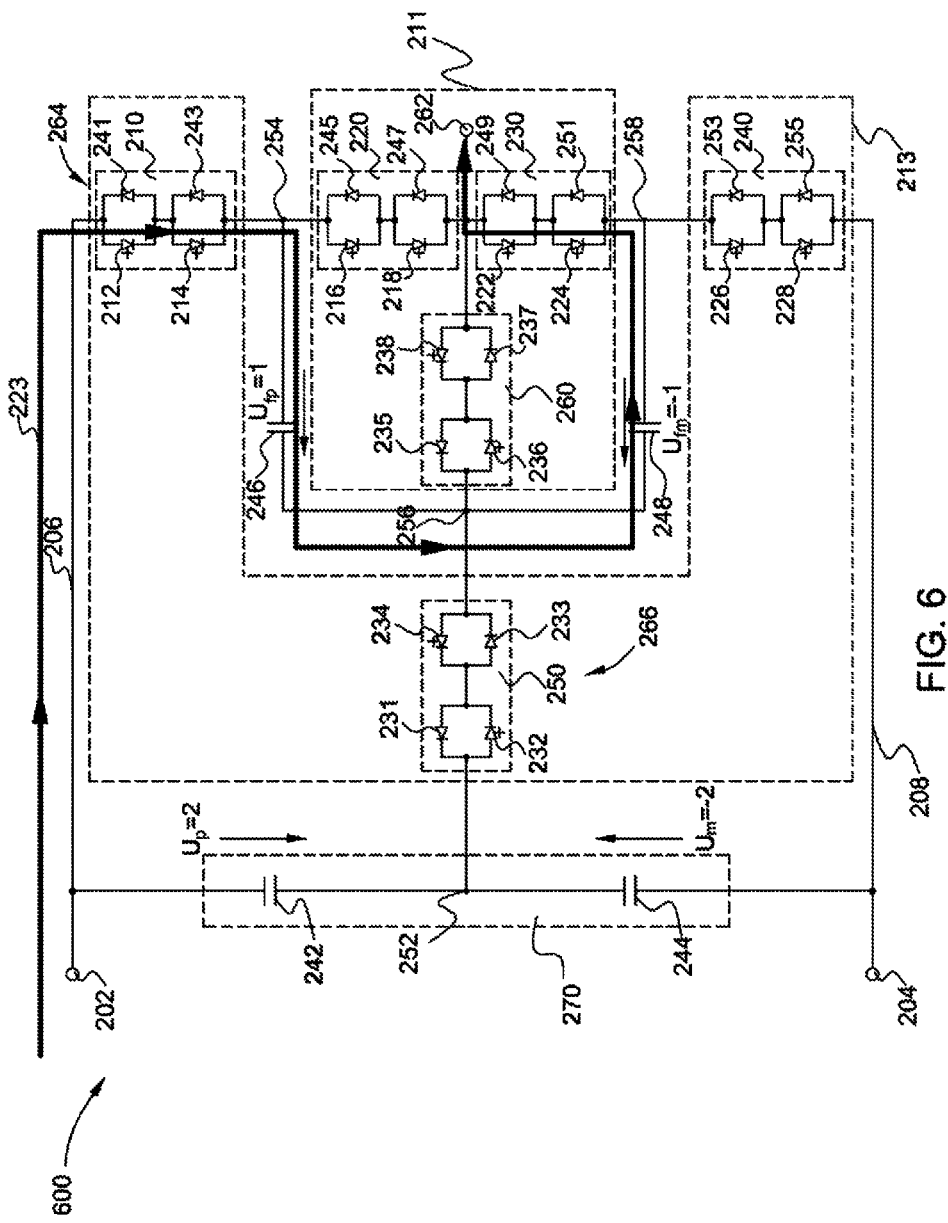

Please refer to FIG. 6; shown is the schematic of the second operating condition 600 of the converter 200 as shown in FIG. 2 also outputting the "0" output voltage; for clarification, the "0" level corresponding to the second operating condition 600 is indicated by "0T". In FIG. 6, the switching devices 232, 234, 236, 238 in the horizontal arm of the bridge 266 are turned off, and the fifth switching unit 210 and the third switching unit 230 in the vertical arm of the bridge 264 are conducting. That is, the switching devices 212, 214, 222, 224 are conducting, while the second switching unit 220 and the sixth switching unit 240 are turned off, thereby forming the second current path 223 between the first port 202 and the output port 262; of which, the second current path 223 flows through the fifth switching unit 210, the first flying capacitor 246, the second flying capacitor 248, and the third switching unit 230, in that order. In addition, under the second operating condition 600, the first flying capacitor 246 is being charged, while the second flying capacitor 248 is being discharged.

Please also refer to FIG. 12; when the output voltage 1202 is at the "0T" level, such as within the time interval of t1-t2, the first flying capacitor voltage 1204 increases linearly and its voltage value is between V3 and V1; the second flying capacitor voltage 1206 decreases linearly, and its voltage value is between V2 and V4.

Figure 7:
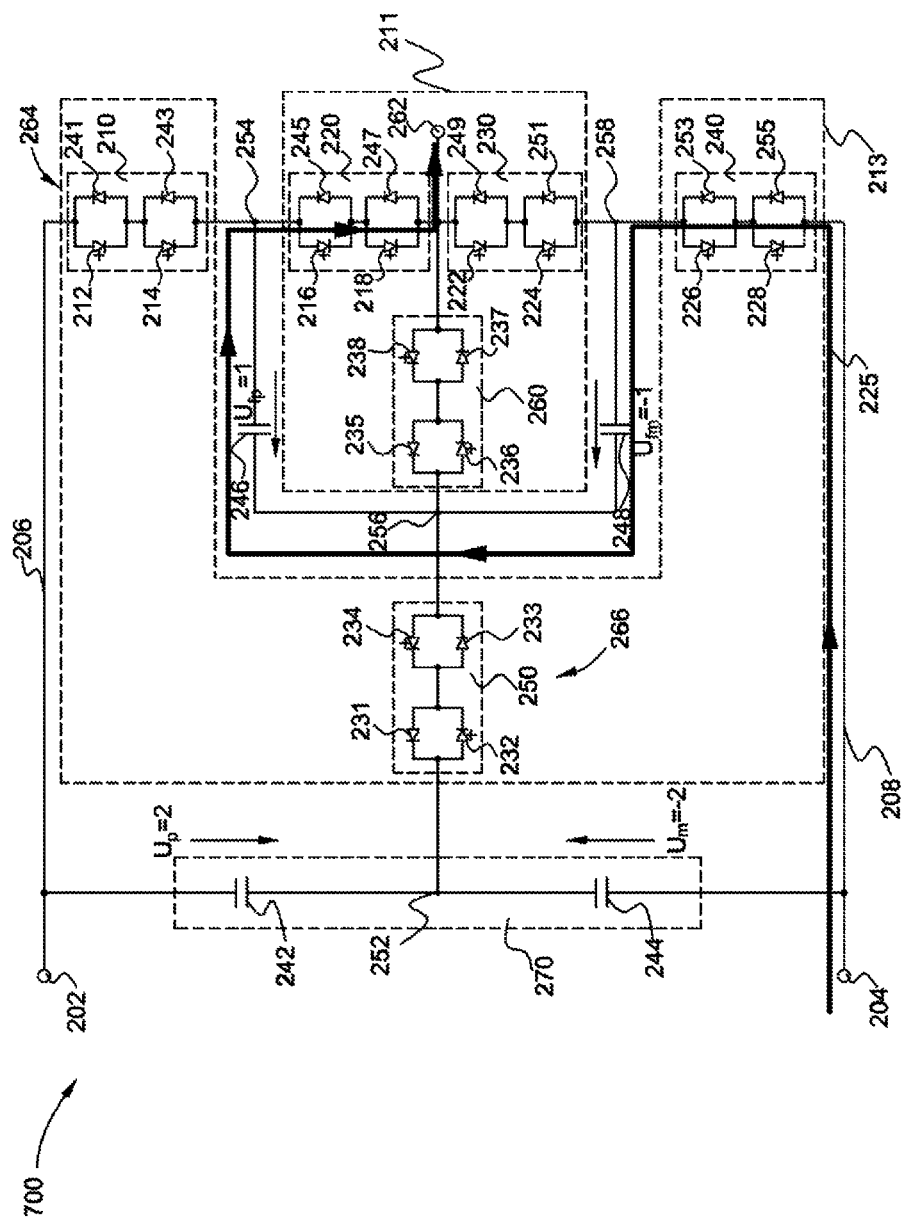

Please refer to FIG. 7; shown is the schematic of the third operating condition 700 of the converter 200 as shown in FIG. 2 also outputting "0" output voltage; for clarification, the "0" voltage corresponding to the third operating condition is indicated by "0S". In FIG. 7, the switching devices 232, 234, 236, 238 of the horizontal arm of the bridge 266 are turned off, and the second switching unit 220 and sixth switching unit 240 of the vertical arm of the bridge 264 are turned on; that is, switching devices 212, 214, 222, 224 are turned on, while the fifth switching unit 210 and the third switching unit 230 are turned off, thereby forming the third current path 225 between the second port 204 and the output port 262; of which, the third current path 225 flows through the sixth switching unit 240, the second flying capacitor 248, the first flying capacitor 246, and the second switching unit 220, in that order. In addition, under the third operating condition 700, the second flying capacitor 248 is being charged, while the first flying capacitor 246 is being discharged.

Please further refer to FIG. 12; when the output voltage 1202 is at "0S" level, such as within the time interval t5-t6, the first flying capacitor voltage 1204 decreases linearly and its voltage value is between V3 and V1; the second flying capacitor voltage 1206 increases linearly and its voltage value is between V2 and V4.

It can be seen from FIGS. 5-7, when the corresponding output voltage of the converter 200 is "0", there exist at least three combinations of switching conditions, or at least three current paths; therefore, in an embodiment, during the startup phase of the electric machine (small modulation index), that is, with low output voltage and high output current, by setting the first pulse pattern distribution unit 304, the converter 200 selectively operates at the three operating conditions 500, 600, 700 as shown in FIGS. 5-7. For example, in a specific embodiment, the "0" level output voltage alternately changes by following the pattern of "0T"-》"0"-》"0S" in terms of time and direction. This way, it can avoid the switching devices or diode devices in the horizontal arm of the bridge 266 from being turned on or conducting for long periods of time, thereby preventing the corresponding switching devices in the vertical arm of the bridge 264 from generating imbalanced heat loss.

Figure 13:
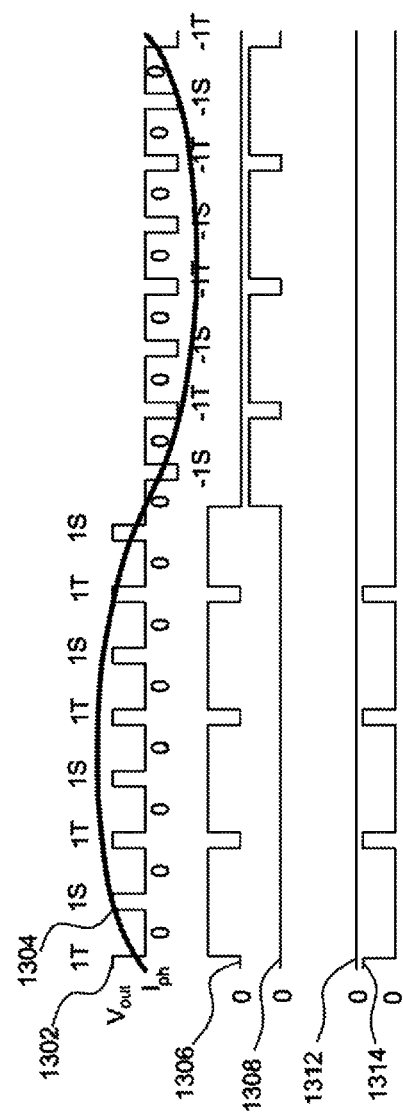
FIGS. 13 and 14 are waveform diagrams generated by a diode and switching tube inside the converting device as shown in FIG. 2, operating under the traditional modulation method and the modulation method provided by the present invention, respectively.
Figure 14:
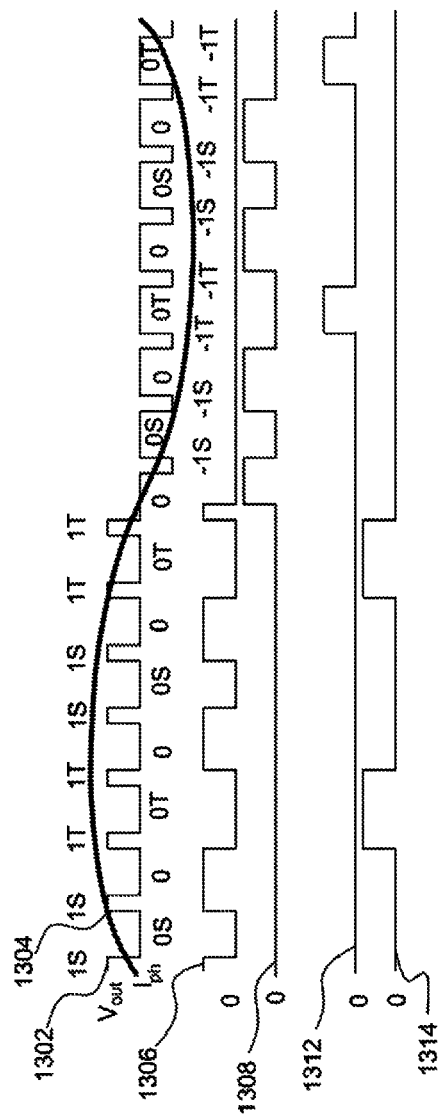

FIG. 13 and FIG. 14 shows the waveform diagram of the output voltage and output current of the corresponding converter as well as the signal waveform diagram of some of the diode devices and switching devices through performing the traditional modulation method and the modulation method proposed by the present invention, respectively; of which, 1302 is the output voltage waveform diagram, 1304 is the output current waveform diagram, 1306 is the signal waveform diagram of the second diode 233 of the fourth switching unit 250 in the horizontal arm of the bridge 266, 1308 is the signal waveform diagram of the second switching device 234 of the fourth switching unit 250 in the horizontal arm of the bridge 266, 1312 is the signal waveform diagram of the diode 241 of the fifth switching unit 210 in the vertical arm of the bridge 264, 1314 is the signal waveform diagram of the switching device 212 of the fifth switching unit 210 in the vertical arm of the bridge 264.

From the waveforms 1306, 1312 in FIG. 13, it can be seen that the diode 233 is only conducting during the positive half cycle of the current, while diode 241 or 243 has been turned off the entire time. Therefore, the conduction loss generated by the diode 233 in one cycle is significantly greater than the losses generated by diode 241 or 243. From 1308, 1341 shown in FIG. 13, it can also be seen that the turned-on time of the switching device 234 in one cycle is significantly longer than the turned-on time of the switching device 212 in one cycle; therefore, the heat loss generated by the switching device 234 in one cycle is also significantly greater than the conduction loss of the switching device 212. In addition, since there is thermal coupling between the diode and the switching device, it further leads to the switching device sustaining a greater thermal stress.

From the waveforms 1306, 1312 in FIG. 14, it can be seen that the diode 233 is only conducting within the positive half cycle of the current, while the diode 241 or 243 is only conducting within the negative half cycle of the current. Compared to the technology at present as shown in FIG. 13, the conduction losses generated by the diode devices from the horizontal arm of the bridge 266 and the vertical arm of the bridge 264 have achieved a certain level of balance. From 1308, 1314 as shown in FIG. 14, it can also be seen that the turned-on time of the switching device 234 within one cycle roughly equals the turned-on time of the switching device 212 within one cycle; therefore, the conduction losses generated by the switching devices of the horizontal arm of the bridge 266 and the vertical arm of the bridge 164 have also achieved a better heat balance. As a result, by performing the modulation method proposed by the present invention, it is possible to avoid the switching devices in the horizontal arm of the bridge 166 from being damaged due to sustaining a greater thermal stress; in other words, it is possible to lengthen their useful life.

Please go back and refer to FIG. 3; in an embodiment, the second pulse pattern distribution unit 306 is connected with the modulation mode selection unit 302 and the modulation unit 334. The second pulse pattern distribution unit 306 is configured to respond to the second modulation mode signal 324 to generate the second pulse pattern signal 328; of which, the second pulse pattern signal 328 indicates the combination switching conditions of the switching devices within the converter 308, or the current path that is expected to be formed. The second pulse pattern signal 328 generates the second pulse signal 338 through the modulation of the modulation unit 334; the second pulse signal 338 is provided to the multiple switching devices within the converter 308 to allow the multiple switching devices of that converter 308 to perform the switching operations according to the specific pattern, in order to output an output voltage at specific levels. For example, after the startup of the electric machine, the converter 308 can output five-level output voltages, including "2", "1", "0", "−1", "−2". It must be explained that "2", "1", "0", "−1", "−2" merely represents five discrete voltage levels; the actual output voltage from the converter 308 may change based on the DC bus voltage. In the present invention, when the second pulse pattern distribution unit 306 operates in response to the second modulation mode signal 324, the operating condition of the heat balance modulation module 300 is defined as "normal operating mode". Corresponding, operations performed by the converter 308 according to the second pulse signal 338 provided by the modulation unit 334 are defined as the "normal energy conversion operations".

Figure 4:
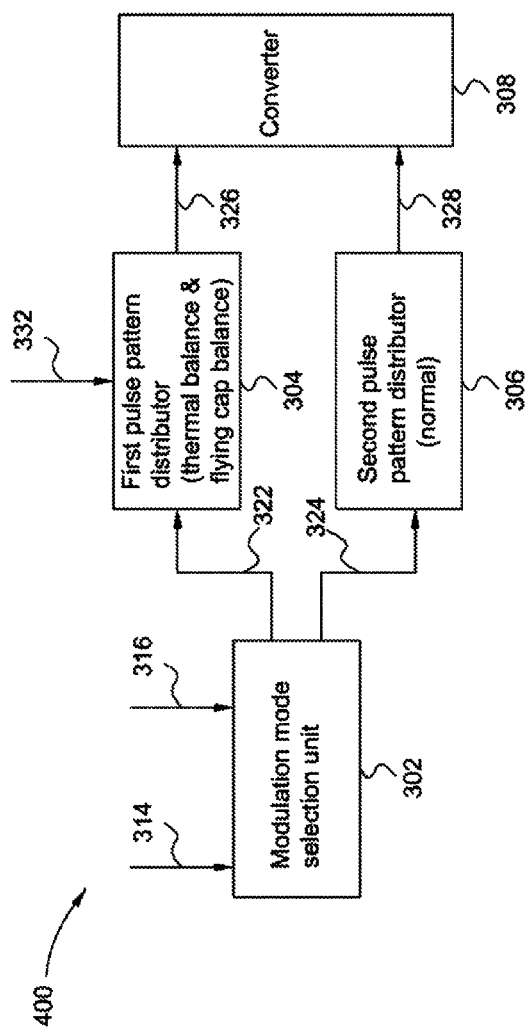
FIG. 4 is a functional block diagram showing an alternate embodiment of the heat balance modulation module executed by the controller of the energy conversion system as shown in FIG. 1.

Next, please refer to FIG. 4; it is a functional block diagram showing an alternate embodiment of the heat balance modulation module 400 performed by the controller in the system as shown in FIG. 1. The heat balance modulation module 400 as shown in FIG. 4 is fundamentally similar to the heat balance modulation module 300 as shown in FIG. 3; for example, the heat balance modulation module 400 also comprises the modulation mode selection unit 302, the first pulse pattern distribution unit 304, the second pulse pattern distribution unit 306 and the modulation unit 324. In particular, in the embodiment as shown in FIG. 4, the first pulse pattern distribution unit 304 is configured to respond to the first modulation mode signal 322, and further generates the first pulse pattern signal 322 based on at least one system status signal 322. In an embodiment, at least one system status signal 322 comprises the voltages of the first flying capacitor 246 and the second flying capacitor 248 in the converter 200 as shown in FIG. 2. In an embodiment, the voltages of the first flying capacitor 246 and the second flying capacitor can be measured using the voltage sensors. In an alternate embodiment, the voltages of the first flying capacitor 246 and the second flying capacitor can also be obtained through calculations using an equation or through estimation. In addition, the system status signal 322 may be the switching cycle voltage of the first flying capacitor 246 and second flying capacitor 248 at present, or it can also be the voltage of a single or multiple future switching cycle. In a specific embodiment, after the obtained system status signal 322 indicates that the voltage of the first flying capacitor 246 and the second flying capacitor 248 did not satisfy the preset conditions, the first pulse pattern distribution unit 304 is configured to the first pulse pattern signal 326 that selects the specific pattern, such that the converter 308 operates under the effect of the first pulse signal 336 with the selected specific pattern, such that the voltages of the first flying capacitor 246 and the second flying capacitor 248 are able to satisfy the preset conditions in the subsequent single or multiple switching cycles. More specifically, when the obtained system status signal 322 indicates that the voltage of the first flying capacitor 246 has exceeded the preset limit, when the output voltage is at the "0" level, it can specifically select the first pulse pattern signal 326 pattern such that the converter 308 operates in the conditions as shown in FIG. 7; that is, the current path 225 is formed in the converter such that the first flying capacitor 246 is discharging, thereby reducing its voltage. Similarly, when the obtained system status signal 322 indicates that the first flying capacitor 246 is lower than the preset limit, when the output voltage is at the "0" level, it can specifically select the first pulse signal 326 pattern such that the converter 308 operates in the conditions as shown in FIG. 6; that is, the current path 223 is formed in the converter such that the first flying capacitor 246 is being charged, thereby increasing its voltage.

Figure 8:
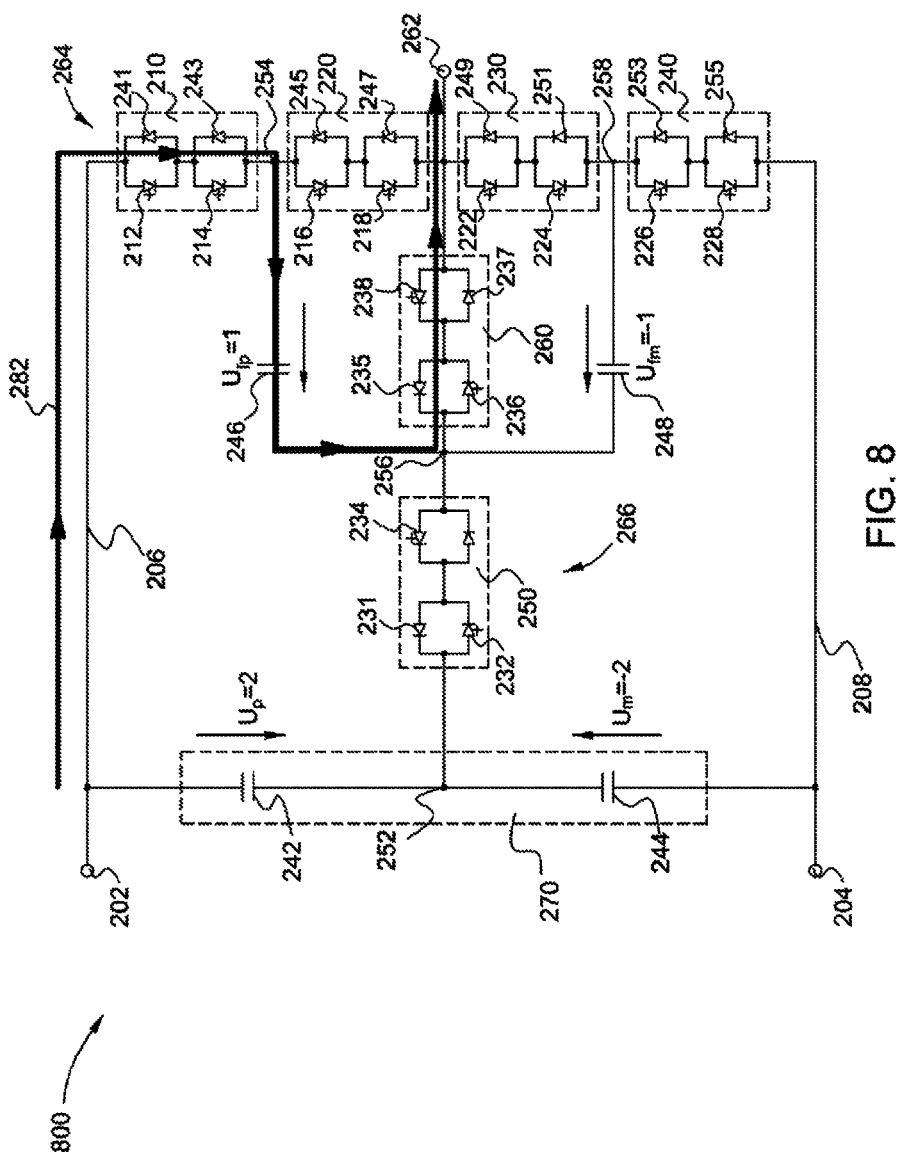
FIGS. 8 and 9 are operating condition schematics showing the two different current paths when the converting device as shown in FIG. 2 is outputting a "1" voltage.
Figure 9:
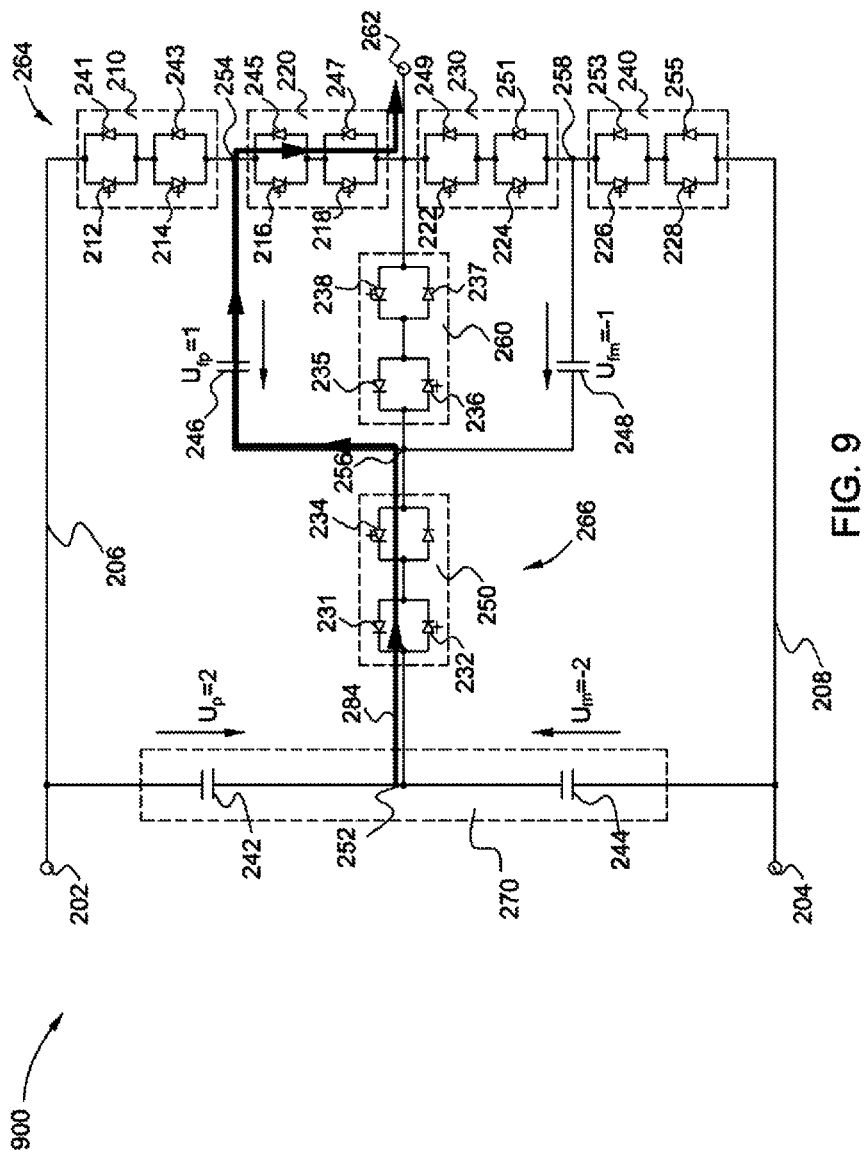

Please further refer to FIG. 8 and FIG. 9, they show the first operating condition 800 and second operating condition 900 when the output voltage of the converter 200 as shown in FIG. 2 is at the "1" level, respectively.

Under the first operating condition 800 as shown in FIG. 8, switching devices 212, 214, 236 are turned on, therefore it allows the current to start from the first input port 202, follows the switching devices 212, 214, first flying capacitor 246, switching device 236, diode 237, to form the first current path 282, reaching the output port 262, to output the level "1" voltage; for clarification, this first operating condition 800 is indicated using "1T".

Under the second operating condition 900 as shown in FIG. 9, switching devices 232, 216, 218 are turned on, therefore it allows the current to start from the DC neutral point 252, follows the switching device 232, diode 233, first flying capacitor 246, switching devices 216, 218, to form the second current path 284, reaching the output port 262, outputting the same level "1" voltage. For clarification, this second operating condition 900 is indicated using "1S".

It can be seen form FIG. 8 and FIG. 9 that the first flying capacitor 246 is being charged and discharged respectively when outputting the level "1" voltage. Therefore, in the embodiment as shown in FIG. 4, the first pulse pattern distribution unit 304 can dynamically adjust the first pulse pattern signal 326 according to the system status signal 332, such that the converter 200 may be operating under the "1T" condition or the "1S" condition, thereby charging or discharging the first flying capacitor 246 to control its voltage. Please refer to FIG. 14 again; within the positive half cycle of the current, when the converter 200 is outputting the level "1" voltage, it is switching according to the "1S"-⟩"1S"-⟩"1T"-⟩"1T"-⟩"1S"-⟩"1S"-⟩"1T"-⟩"1T" pattern.

Figure 10:
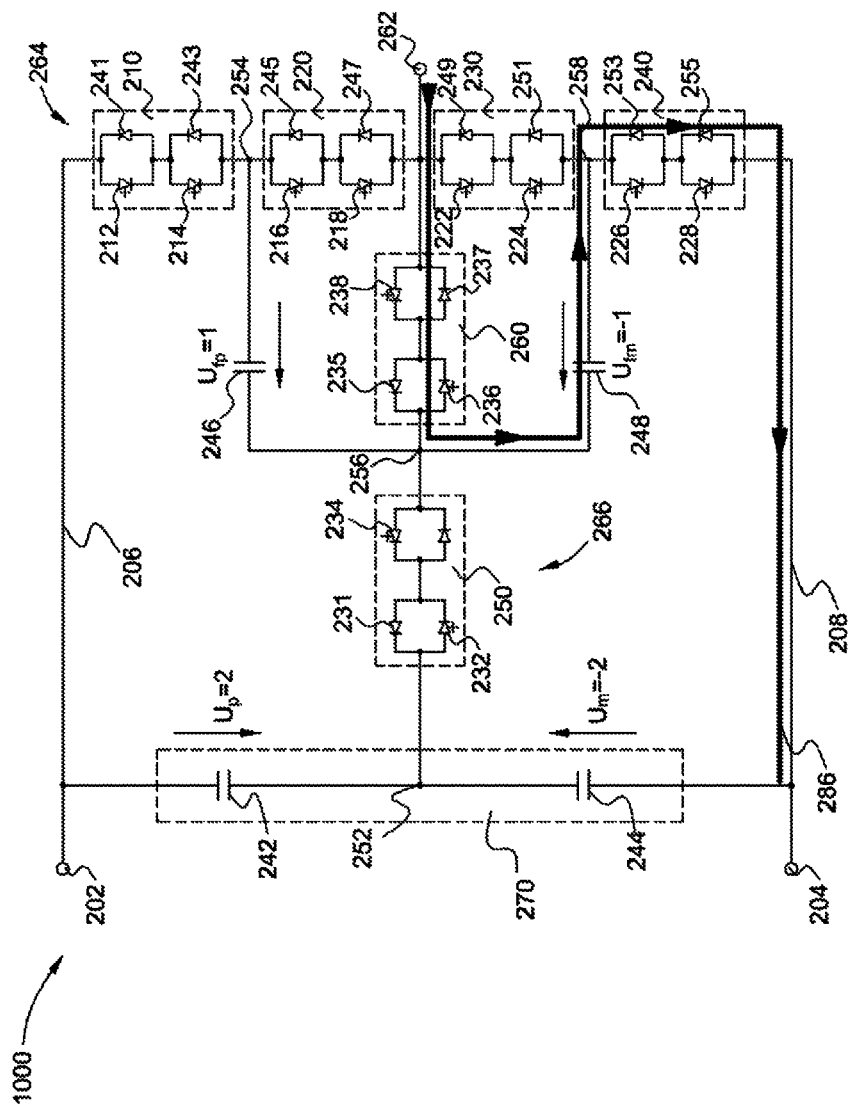
FIGS. 10 and 11 are operating condition schematics showing the two different current paths when the converting device as shown in FIG. 2 is outputting a "−1" voltage.
Figure 11:
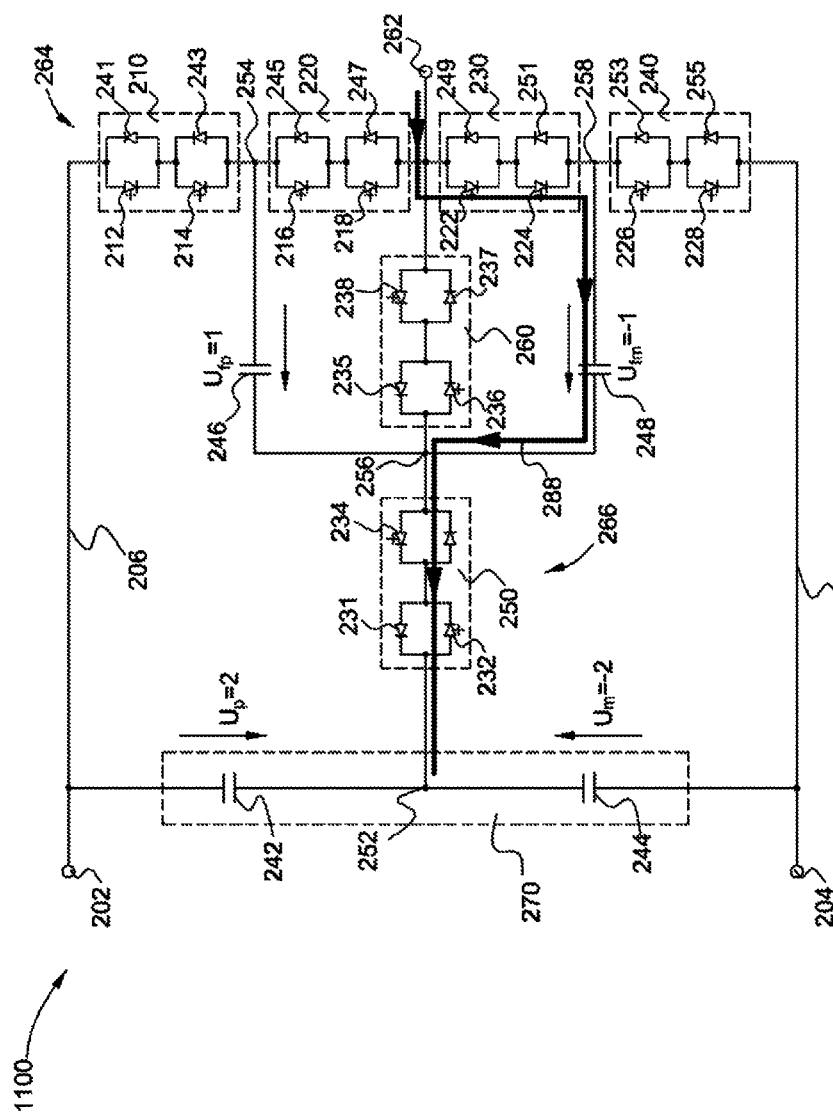

Please further refer to FIG. 10 and FIG. 11, they show the first operating condition 1000 and second operating condition 1100 when the output voltage of the converter 200 as shown in FIG. 2 is at the "−1" level, respectively.

Under the first operating condition 1000 as shown in FIG. 10, switching devices 238, 226, 228 are turned on, therefore it allows the current to start from the output port 262, follows the switching device 238, diode 235, second flying capacitor 248, switching devices 226, 228, to form the first current path 286, reaching the second input port 204, to output the "−1" level voltage; for clarification, this first operating condition 1000 is indicated using "−1T".

Under the second operating condition 1100 as shown in FIG. 11, switching devices 222, 224, 234 are turned on, therefore it allows the current to start from the output port 262, follows the switching devices 222, 224, second flying capacitor 248, switching device 234, diode 231, to form the second current path 288, reaching the DC neutral point 252, outputting the same "−1" level voltage. For clarification, this second operating condition 1100 is indicated using "−1S".

It can be seen from FIG. 10 and FIG. 11 that when the second flying capacitor 246 is outputting the "−1" level voltage, it is being charged and discharged respectively. Therefore, in the embodiment as shown in FIG. 4, the first pulse pattern distribution unit 304 can dynamically adjust the first pulse pattern signal 326 according to the system status signal 332 such that the converter 200 may be either operating under the "−1T" condition or the "−1S" condition, thereby charging or discharging the second flying capacitor 248 to control its voltage. Please refer to FIG. 14 again; within the negative half cycle of the current, when the converter 200 is outputting the "−1" level voltage, it is switching according to the "−1S"-⟩"−1S"-⟩"−1T"-⟩"−1T"-⟩"−1S"-⟩"−1S"-⟩"−1T"-⟩"−1T" pattern.

It must be explained that, in the embodiment as shown in FIG. 4, the second pulse pattern distribution unit 206 can also dynamically adjust the second pulse pattern signal 328 according to a single or multiple system status signals (not illustrated) such that the converter 200 operates under the different operating conditions as shown in FIGS. 8-11, thereby selectively charging and discharging the first flying capacitor 246 and the second flying capacitor 248 and adjust both of their voltages or achieve a balance between the two.

Figure 15:
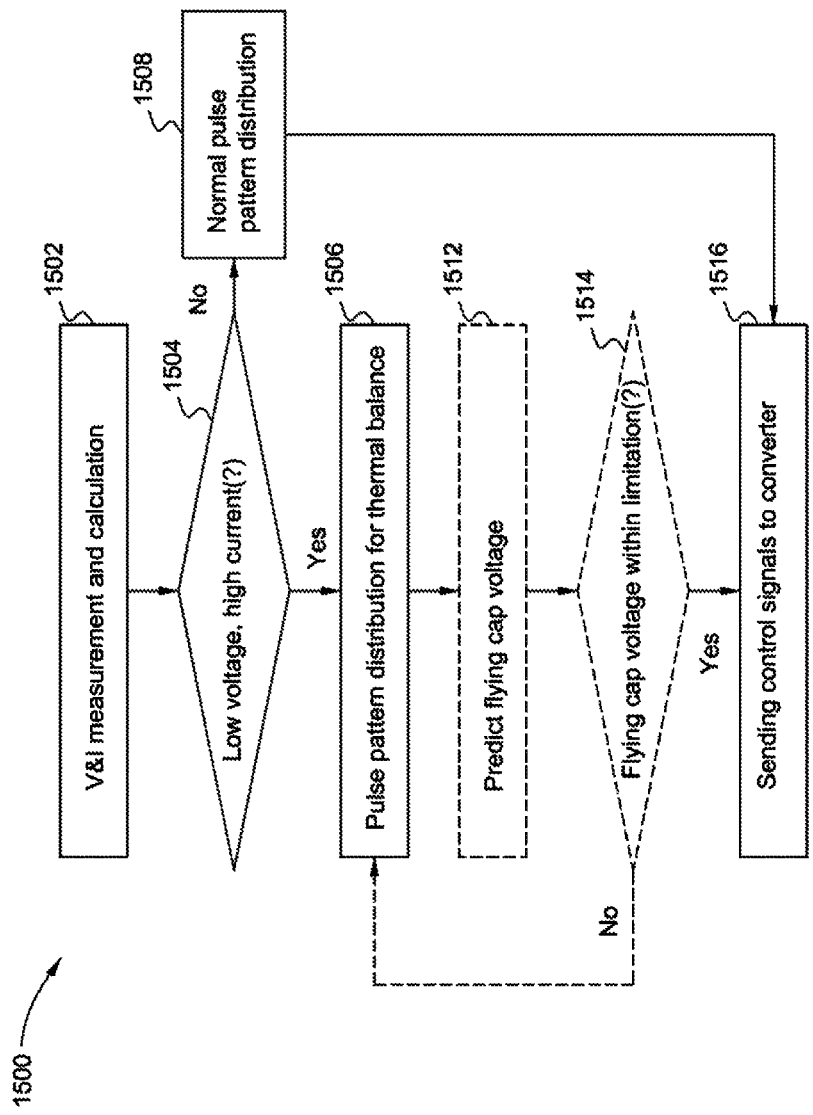
FIG. 15 is a flow chart showing an embodiment of the method proposed by the present invention.

Next, please refer to FIG. 15; it shows the flow chart of an embodiment of method 1500. In an embodiment, this method is executed in the energy conversion system as shown in FIG. 1; in particular, it is used to control the energy conversion system 120 or the converter 200 with the NPP topology as shown in FIG. 2, in order to provide multi-level output voltage to the load 130, such as an AC electric machine.

In an embodiment, this method 1500 is able to begin execution from step 1502. In step 1502, a single or multiple signals are obtained. In an embodiment, this signal can comprise the voltage signal and current signal received by the load, or the voltage signal and current signal output by the converter. In an alternate embodiment, this signal can also comprise the previously entered voltage command signal and current command signal, or the voltage signal and current command signal obtained through calculations. Also, in some embodiments, this signal can also be the modulation index signal. Furthermore, in some embodiments, this signal can also be the thermal signal of the converter device.

In an embodiment, this method 1500 also comprises step 1502. In step 1502, the operating condition of the energy conversion system is determined based on a single or multiple signals being obtained. More specifically, in step 1502, it is determined whether the load is operating under the startup phase. In an embodiment, when the voltage signal is less than the preset voltage threshold and the current signal is greater than the current threshold, determine that the load is operating under the startup phase, then the method 1500 turns to execute step 1506. When the voltage signal is no less than the preset voltage threshold or the current signal is no greater than the preset current threshold, determine that the load is not operating under the startup phase, then the method 1500 turns to execute step 1508. In an alternate embodiment, when the modulation index is less than the preset threshold, determine that the load is operating under the startup phase, then the method 1500 turns to execute step 1506. When the modulation index is no less than the preset threshold, determine that the load is not operating under the startup phase, then the method 1500 turns to execute step 1508.

In an alternate embodiment, in step 1502, determine whether the converter device is overheating or thermally imbalance. When the thermal signal is greater than the preset temperature threshold, determine that the converter device is overheating or thermally imbalance, the method 1500 turns to execute step 1506; when the thermal signal is no greater than the preset temperature threshold, determine that the converter device is not overheating or thermally imbalance, then the method 1500 turns to execute step 1508.

In an embodiment, this method 1500 also comprises step 1506. In step 1506, after determining that the load is operating under the startup phase or that the converter device is overheating, generate the first pulse signal. More specifically, pattern of the first pulse signal changes according to the converter output voltage level that must be provided. The "pulse signal pattern" described here refers to the combination of control signals provided to the multiple switching devices in the converter. For example, when the voltages that the converter must output comprise multiple "0" level voltages, it can alternately select the first pulse signal pattern such that the converter selectively operates between the three operating conditions as shown in FIG. 5, FIG. 6, and FIG. 7; this is conducive to balancing the thermal conditions of the multiple switching devices in the converter 200.

In an embodiment, this method 1500 also comprises step 1508. In step 1508, after determining that the load is not operating under the startup phase or that the converter is not overheating, generate the second pulse signal.

In an embodiment, this method 1500 also comprises step 1512. In other embodiments, step 1512 can also be omitted. In step 1512, at least one flying capacitor voltage is obtained. The flying capacitor voltage can be measured through the sensors, or it can be calculated using an equation or through estimation.

In an embodiment, this method 1500 also comprises step 1514. In step 1514, determine whether the flying capacitor voltage satisfies the preset conditions. More specifically, in an embodiment, determine whether the flying capacitor voltage is too high or too low. If the flying capacitor voltage does not satisfy the preset conditions, such as when it is higher than the preset value, method 1500 returns to step 1506 to modify the pattern of the first pulse signal. More specifically, in an embodiment, when the voltage of the first flying capacitor 246 as shown in FIG. 2 is too high, it can generate the specific first pulse signal 325 (see FIG. 4) such that when the converter outputs the "0" level voltage, it preferentially select the operating condition as shown in FIG. 7 and discharge the first flying capacitor 246 in order to reduce its voltage. If the flying capacitor voltage satisfies the preset conditions, the method 1500 turns to step 1516.

In an embodiment, this method 1500 also comprises step 1516. In step 1516, transmit the first pulse signal generated in step 1506 or the second pulse signal generated in step 1508 to the converter such that the converter performs energy conversion operations in order to provide suitable output voltage and output current to the load, such as an AC electric machine.

Although the present invention has been explained in connection with specific embodiments, those skilled in the art can appreciate that many modifications and variations can be made to the present invention. Therefore, it must be understood that the intention of the claims is to cover the actual concept of the present invention as well as all of these modifications and variations within its scope.

What is claimed is:

1. A power conversion system, comprising:
   a multi-level power converter operable to provide a multi-level output voltage having at least one positive voltage level, a zero voltage level, and at least one negative voltage level, the multi-level power converter comprising:
      a first converter module comprising a first switch unit, a second switch unit, and a third switch unit; and
      a second converter module coupled to the first converter module, the second converter module comprising a fourth switch unit, a fifth switch unit, and a sixth switch unit; and
   a controller in communication with the multi-level power converter and capable of being operated under at least a normal modulation mode and a thermal balancing modulation mode depending at least on the magnitude of the multi-level output voltage, wherein the controller is operable to send control signals to the multi-level power converter to select among at least three different current paths therein for controlling the multi-level power converter to provide the zero level output voltage in the thermal balancing modulation mode while reducing thermal stress on the switch units of the multi-level power converter.

2. The power conversion system of claim 1, wherein the multi-level power converter is configured to provide a $2n+1$ level output voltage, where n is equal to or larger than two.

3. The power conversion system of claim 1, wherein one of the at least three different current paths is through the second and sixth switch units.

4. The power conversion system of claim 3, wherein another of the at least three different current paths is through the third and fifth switch units.

5. The power conversion system of claim 1, wherein each of the first and fourth switch units comprise:
   a first switching device controllable to allow a first electric current to flow therethrough along a first direction;
   a first diode coupled in parallel to the first switching device, the first diode arranged to allow a second electric current to flow therethrough along a second direction opposite to the first direction;
   a second switching device controllable to allow the second electric current to flow therethrough along the second direction; and
   a second diode coupled in parallel to the second switching device, the second diode arranged to allow the first electric current to flow therethrough along the first direction.

6. The power conversion system of claim 1, wherein at least one of the second, third, fifth, and sixth switch units comprise at least two switching devices connected in series.

7. The power conversion system of claim 1, further comprising:
   a DC link comprising a first DC capacitor and a second DC capacitor; and
   a flying-cap link comprising a first flying capacitor and a second flying capacitor;
   wherein the three different current paths corresponding to the zero voltage level comprise:
      a first current path comprising the first and third switch units;
      a second current path comprising the first DC capacitor, the second switch unit, the first flying capacitor, the second flying capacitor, and the sixth switch unit; and
      a third current path comprising the second DC capacitor, the third switch unit, the second flying capacitor, the first flying capacitor, and the fifth switch unit.

8. The power conversion system of claim 7, wherein the controller is further operable to send control signals to the multi-level power converter to select the three different current paths in a manner to balance the voltages at the first and second flying capacitors in the thermal balancing modulation mode.

9. A power conversion system, comprising:
   a multi-level power converter comprising a plurality of switching devices operable to convert a direct-current (DC) voltage at a DC link to a multi-level alternating-current (AC) voltage for use by a motor; and
   a controller in communication with the multi-level converter, the controller comprising:
      a modulation mode selection unit for generating a first modulation mode signal upon determining the motor is operating under a first condition and generating a second modulation mode signal upon determining the motor is operating under a second condition, wherein the modulation mode selection unit is operable to identify that the motor is operating under the first condition upon determining that an actual AC output voltage of the multi-level power converter is less than a voltage threshold and an actual AC output current from the multi-level power converter is greater than a current threshold;
      a first pulse pattern distributor (304) coupled to the modulation mode selection unit and operable to generate first pulse signals for controlling the plurality of switching devices to substantially balance the thermal conditions of the plurality of switching devices according to the first modulation mode signal; and
      a second pulse pattern distributor (306) coupled to the modulation mode selection unit and operable to generate second pulse signals for controlling the plurality of switching devices to perform normal power conversion operations according to the second modulation mode signal.

10. The power conversion system of claim 9, wherein the modulation mode selection unit is operable to identify that the motor is operating under the first condition upon determining that an AC output command voltage indicative of a desired AC output voltage of the multi-level power converter is less than a voltage threshold and an AC output command current indicative of a desired AC output current of the multi-level power converter is greater than a current threshold.

11. The power conversion system of claim 9, wherein modulation mode selection unit is to generate the first modulation mode signal upon determining a modulation index is less than a threshold value.

12. The power conversion system of claim 9, wherein the first pulse pattern distributor is operable to modify the first pulse signals if the voltages at the flying capacitors are not balanced according to pre-set criteria.

13. A method for operating a power converter capable of providing a multi-level output voltage to a load, comprising:

determining whether the load powered by the power converter is operating under a first condition or a second condition;

generating first pulse signals to select among at least three different current paths when the load is operating under the first condition to allow the power converter to provide a same level output voltage;

generating second pulse signals to allow the power converter to perform normal power conversion operations when the load is operating under the second condition;

determining whether the voltages at flying capacitors in association with the power converter are balanced; and modifying the first pulse signals upon determining that the voltages at the flying capacitors are not balanced.

14. The method of claim 13, wherein determining whether the load is operating under a first condition or a second condition comprises:

determining whether an actual output voltage of the power converter is less than a voltage threshold;

determining whether an actual output current of the power converter is greater than a current threshold; and generating a first signal indicating that the load is operating under the first condition upon determining that the actual output voltage is less than the voltage threshold and the actual output current is greater than the current threshold.

15. The method of claim 13, wherein determining whether the load is operating under a first condition or a second condition comprises:

determining whether an output command voltage indicating a desired output voltage of the power converter is less than a voltage threshold;

determining whether an output command current indicating a desired output current of the power converter is greater than a current threshold; and generating a first signal indicating that the load is operating under the first condition upon determining that the output command voltage is less than the voltage threshold and the output command current is greater than the current threshold.

16. The method of claim 13, wherein determining whether the load is operating under a first condition or a second condition comprises:

determining whether a modulation index in association with the power converter is less than a threshold value; and generating a first signal indicating that the load is operating under the first condition upon determining that the modulation index is less than the threshold value.

17. The method of claim 13, wherein the same level output voltage is zero.

* * * * *